United States Patent
Kadobayashi

(10) Patent No.: US 8,425,233 B2
(45) Date of Patent: Apr. 23, 2013

(54) TOOTH FOR JAW TOOTH MODEL AND METHOD FOR PRODUCING THE SAME

(75) Inventor: Yusei Kadobayashi, Kyoto (JP)

(73) Assignee: Kabushiki Kaisha Shofu, Kyoto (JP)

( * ) Notice: Subject to any disclaimer, the term of this patent is extended or adjusted under 35 U.S.C. 154(b) by 728 days.

(21) Appl. No.: 12/308,169

(22) PCT Filed: Jun. 12, 2006

(86) PCT No.: PCT/JP2006/311768
§ 371 (c)(1),
(2), (4) Date: Mar. 17, 2009

(87) PCT Pub. No.: WO2007/144932
PCT Pub. Date: Dec. 21, 2007

(65) Prior Publication Data
US 2009/0239204 A1    Sep. 24, 2009

(51) Int. Cl.
G09B 23/28    (2006.01)

(52) U.S. Cl.
USPC .............................. 434/263; 264/16; 264/19

(58) Field of Classification Search ................. 434/263, 434/264; 264/16, 19
See application file for complete search history.

(56) References Cited

U.S. PATENT DOCUMENTS

| | | | |
|---|---|---|---|
| 2,750,670 A * | 6/1956 | Vigg | 434/264 |
| 3,367,027 A * | 2/1968 | Kato | 433/206 |
| 4,772,436 A * | 9/1988 | Tyszblat | 264/19 |
| 5,120,229 A * | 6/1992 | Moore et al. | 434/263 |
| 5,776,382 A * | 7/1998 | Kim et al. | 264/16 |
| 6,106,747 A | 8/2000 | Wohlwend | |
| 6,926,532 B1 * | 8/2005 | Brattesani | 434/263 |
| 2003/0096214 A1 | 5/2003 | Luthardt et al. | |
| 2005/0082702 A1* | 4/2005 | Wennemann | 264/16 |
| 2006/0024652 A1* | 2/2006 | Ose et al. | 434/263 |

FOREIGN PATENT DOCUMENTS

| | | |
|---|---|---|
| DE | 19500658 | 7/1996 |
| DE | 10 2004 044 845 | 3/2006 |
| JP | 63-174909 | 7/1988 |
| JP | 11-502733 | 3/1999 |
| JP | 2003-515429 | 5/2003 |
| JP | 2005-253756 | 9/2005 |
| JP | 2006-163330 | 6/2006 |
| JP | 2006-163331 | 6/2006 |

OTHER PUBLICATIONS

Extended European Search Report dated Mar. 15, 2011 in corresponding European Patent Application No. 06 75 7253.

(Continued)

*Primary Examiner* — Gene Kim
*Assistant Examiner* — Joseph B Baldori
(74) *Attorney, Agent, or Firm* — Wenderoth, Lind & Ponack, L.L.P.

(57) ABSTRACT

A tooth to be used in a jaw tooth model which allows students under dental training to experience oral works and therapeutic practices. More particularly, the present invention relates to a tooth to be used for experiencing morphological studies in the formation of an anchor tooth, the formation of a cavity and so on, particularly a tooth to be used in a jaw tooth model provided with standards for evaluating tooth formation, a method of producing the same, and an apparatus for confirming tooth formation to be used in a jaw tooth model which is provided with standards for evaluating tooth formation.

4 Claims, 3 Drawing Sheets

OTHER PUBLICATIONS

Patent Cooperation Treaty (PCT) International Preliminary Report on Patentability, issued Jan. 13, 2009.

International Search Report issued Sep. 12, 2006 in the International (PCT) Application of which the present application is the U.S. National Stage.

Markus B. Blatz, et al., "*Adhesive Cementation of High-Strength Ceramic Restorations: Clinical and Laboratory Guideline*", Quintessence of Dental Technology, Japan, Quintessence Publishing, Oct. 10, 2003; vol. 28, No. 10, pp. 1369-1376.

\* cited by examiner

TOOTH FOR JAW TOOTH MODEL AND METHOD FOR PRODUCING THE SAME

BACKGROUND OF THE INVENTION

1. Technical Field

The present invention relates to a tooth to be used in a jaw tooth model which allows students under dental training to experience oral works and therapeutic practices. More particularly, the present invention relates to a tooth to be used for experiencing morphological impartations in the formation of an anchor tooth, the formation of a cavity and so on, particularly a tooth to be used in a jaw tooth model provided with standards for evaluating tooth formation, a method of producing the same, and an apparatus for confirming tooth formation to be used in a jaw tooth model which is provided with standards for evaluating tooth formation.

2. Description of the Related Art

The use of a tooth for a jaw tooth model to be used for therapeutic practices in the oral cavity formed of an epoxy resin or a melamine resin is wide spread because of problems such as lack of natural teeth for therapeutic practices and infection diseases associated with a natural tooth.

However, a tooth for a jaw tooth model formed of an epoxy resin or a melamine resin exhibits cutting sensation which is different from that of a natural tooth. Therefore, even when performing formation trainings such as anchor tooth formation and cavity preparation, the cutting sensation and handling properties are different from that in actual oral work, which confuses the students. Specifically, the epoxy resin and the melamine resin are soft and thus there is a tendency to overcut them, while the natural tooth is hard and there is a tendency not to satisfactorily cut it. As a result, there is a possibility not to overcut it upon treatment and it is not easy to satisfactorily perform applications.

As a result of the need for a little harder material, a composite type tooth is commercially available. However even a composite type tooth has a cutting sensation of the tooth which is different from that of a natural tooth. Therefore, even when performing formation training such as anchor tooth formation and cavity preparation, the cutting sensation and handling properties are different from that in dental work in the oral cavity in practice, which confuses the students. To state the matter clearly, the cutting sensation includes a slipperiness and is substantially different from a natural tooth.

Japanese Unexamined Patent Publication (Kokai) No. 5-224591 discloses a tooth model which has cutting properties remarkably similar to the cutting properties of a natural tooth, and is suited for dental training of cutting works in a dental education. The tooth model contains, as main constituent components, an inorganic substance powder and a cross-linkable resin in a weight ratio within a range from 20%:80% to 70%:30%.

As the inorganic substance power constituting the tooth model, for example, alumina, zirconia, titania and silica are exemplified. It is not limited to the above compounds and various inorganic substance powders can be used.

However, since the cutting properties of the tooth model are different from those of a natural tooth, even when performing formation training such as anchor tooth formation and cavity preparation, the cutting sensation and handling properties are different from those of actual oral work which confuses the students. Also, only an inorganic substance powder is disclosed.

Japanese Unexamined Patent Publication (Kokai) No. 5-216395 introduces that there are provided a tooth model-which has cutting properties remarkably similar to the cutting properties of a natural tooth, and is suited for dental training of cutting work in a dental education and a method for producing the same. The tooth model contains, as main constituent components, a hydroxyapatite powder having a porosity of 40 to 80% and a (meth)acrylic acid ester-based resin in a weight ratio within a range of 20%:80% to 50%:50%.

A conventional tooth model has not satisfactory cutting properties. Therefore, the patent document discloses that the development of a tooth model having cutting properties resembling cutting properties of a natural tooth is required, but does not disclose sufficient cutting sensation.

Japanese Unexamined Patent Publication (Kokai) No. 5-224591 provides a tooth model which is most suitably used for therapeutic practice of periodontal diseases for dental students. The tooth model has such a configuration that at least the surface of a dental crown part has a Knoop hardness of 70 or more and at least the surface of a tooth root part has a Knoop hardness of 10 to 40.

The specification describes that "the tooth model may be formed of a material having any hardness, for example, metal, ceramics or resin from the viewpoint of a production method of a tooth model and economy, and also may include cavities". However, the cutting sensation is not still improved.

Japanese Unexamined Patent Publication (Kokai) No. 5-241498, Japanese Unexamined Patent Publication (Kokai) No. 5-241499 and Japanese Unexamined Patent Publication (Kokai) No. 5-241500 describe an inorganic filler and a hydroxyapatite filler. However, any tooth model is formed of a resin as a base material, and the cutting sensation is not still improved.

Japanese Unexamined Patent Publication (Kokai) No. 2004-94049 describes an invention which provides a model tooth for dental training, that enables accurate shape measurement utilizing a laser beam.

The specification contains the disclosure that "As the material constituting the surface of a dental crown part of model tooth of the present invention, known materials can be used and examples thereof include porcelains such as ceramics; thermoplastic resin materials such as acryl, polystrene, polycarbonate, acrylonitrile-styrene-butadiene copolymer (ABS), polypropylene, polyethylene and poly ester; thermocurable resin materials such as melamine, urea, unsaturated polyester, phenol and epoxy; and materials obtained by adding, to these main raw materials, additives, for example, organic and inorganic various reinforced fibers such as glass fiber, carbon fiber, pulp and synthetic resin fibers, various fillers such as talc, silica, mica, calcium carbonate, barium sulfate and alumina, colorants such as pigments and dyes, or weathering agents and antistatic agents". However, there is no description about preferred materials and the cutting sensation is not still improved.

The above patent document does not disclose a specific composition and only discloses a relation between the dental crown part and the tooth root part with respect to the cutting sensation.

Although the jaw tooth model has these problems, there have almost been no studies carried out on the problems of the jaw tooth model.

In the case of single molding of the epoxy resin and the melamine resin, when a cavity and an anchor tooth are formed, a university instructor generally teaches through visual observation whether or not the cavity and anchor tooth are satisfactorily formed.

Since this method takes humans as a standard, it is assumed that evaluation criteria slightly vary depending on the physical condition, environmental state upon measurement or the like. Furthermore, since only skilled persons can evaluate, considerable effort is required.

There is now reported a system in which 3D data of the tooth thus formed are obtained by PC, overlapped with the data of the formation by the teacher, and then evaluated.

However, according to this method, 3D data must be obtained for every formation and thus it was difficult to evaluate data of a number of students within a short time.

Some teeth comprising an enamel layer and a dentin layer each having a reproduced color are commercially available. However, these teeth could not be used for the method since they were not for evaluating the formation.

Japanese Unexamined Patent Publication (Kokai) No. 5-241498 describes that there is provided a tooth model suited for use, by dental students, in practice teachings for learning an endodontic treatment to cut the lesion part of a dentin texture and to remove the lesion of a marrow cavity part using a reamer or file so as to treat the lesion, such as dental caries, progressing down to the marrow cavity part.

There is introduced a tooth model which has the marrow cavity part comprising a pulp chamber part and a root canal part formed of a soft material having a Knoop hardness of 10 or less or formed as a cavity in a tusk-shaped member, and at least the dentin texture part surrounding the pulp chamber part is composed of a material containing hydroxyapatite and a (meth)acrylic acid ester-based resin as main components.

The tooth model of the above invention can only be used for treatment of lesion of the dental pulp part, and evaluation cannot be performed. Besides, it is impossible to evaluate treatment of formation of an anchor tooth, the formation of a cavity, and the like.

Japanese Unexamined Patent Publication (Kokai) No. 5-241499 and Japanese Unexamined Patent Publication (Kokai) No. 5-241500 provide a tooth model for dental crown repairing practices suited for use, by dental students, in dental training for learning a dental crown repairing treatment by cutting a tooth using a cutting bar, forming a cavity, performing an acid etching treatment and filling the cavity with a filling material. The enamel texture part of the surface of the dental crown part of a tooth-shaped member is composed of a hard material containing a dense inorganic substance powder, the dentin texture part inside the enamel texture part is composed of a softer material than the material of the enamel texture part, and also each material constituting the enamel texture part and the dentin texture part has an adhesive strength to a filling material to the surface of the part to be treated after an acid etching treatment of 50 kg/cm$^2$ or more.

Although there is a possibility which specifically shows the shape of the natural tooth and enables experience of cutting closer to practice, it is impossible to evaluate a treatment of the formation of an anchor tooth, the formation of a cavity and the like.

Japanese Unexamined Patent Publication (Kokai) No. 2004-94049 introduces a model tooth for dental training, which has a dental crown part formed by imitating the shape of the tooth, wherein at least the dental crown part is formed of an opaque or translucent dental crown part forming material, and a light reflectance of the surface of the dental crown part is 70% or more to light having a wavelength of 700 nm. Since the shape of the dental crown part can be accurately measured by a non-contact high-speed three-dimensional shape analyzer, it is possible to accurately evaluate the results of various therapeutic practices and processing practices in the field of education utilizing such an effect.

However, since in the invention, the non-contact high-speed three-dimensional shape analyzer must be used for evaluation, large-scaled equipment is required and a long time is required for the measurement of the shape, and thus the model tooth could not be easily used for evaluation in a lesson.

[Patent Document 1] Japanese Unexamined Patent Publication (Kokai) No. 2004-94049
[Patent Document 2] Japanese Unexamined Patent Publication (Kokai) No. 5-241498
[Patent Document 3] Japanese Unexamined Patent Publication (Kokai) No. 5-241499
[Patent Document 4] Japanese Unexamined Patent Publication (Kokai) No. 5-241500
[Patent Document 5] Japanese Unexamined Patent Publication (Kokai) No. 5-224591
[Patent Document 6] Japanese Unexamined Patent Publication (Kokai) No. 5-216395
[Patent Document 7] Japanese Unexamined Patent Publication (Kokai) No. 5-224591

SUMMARY OF THE INVENTION

1. Problem to be Solved by the Invention

A conventional jaw tooth model exhibits a cutting sensation which is different from that of a natural tooth. Therefore, even when performing formation training such as anchor tooth formation and cavity preparation, the cutting sensation and handling properties are different from those of actual oral work, which confuses the students. To state the matter clearly, the cutting sensation includes a slipperiness and easily cutting sensation, and is substantially different from a natural tooth. It is required to develop a jaw tooth model-like tooth which can exhibits the same cutting sensation as that of a natural tooth.

A conventional tooth for a jaw tooth model has a natural tooth form. However, when the formation of an anchor tooth and the formation of a cavity are performed, a university teacher and the like must have evaluated the formation since it is not provided with evaluation criteria.

Furthermore, in a test, the teacher must visually confirmed individual evaluation. When the student practices the formation alone, it was impossible to evaluate the formation by using a conventional tooth for a jaw tooth model. When the formation of an anchor tooth and the formation of a cavity are evaluated in the test and the like, it is necessary to confirm formability in a lot and a university teacher and the like must evaluate the formation, which requires a lot of time. Evaluation using 3D data also requires a lot of time. Therefore there is a need for a material capable of evaluating quickly and easily without using an expensive equipment even if the user is a person who has neither special knowledge nor experience.

When the formation is performed again after easily finding a formation fault part, there was required a method capable of easily confirming the formation even if the user is an amateur.

A conventional tooth for a jaw tooth model exhibits cutting sensation which is different from that of a natural tooth. Therefore, when performing formation training such as anchor tooth formation and cavity preparation, the cutting sensation and handling properties are different from those of actual oral work, which confuses the students. Therefore, a tooth for a jaw tooth model evaluated sufficiently could not make use of the accomplishment of the practicing in the human oral cavity.

Thus, there is a need for a tooth for a jaw tooth model, which can exhibit the same cutting sensation as that of a natural tooth, and can easily evaluate the right and wrong of the formation of an anchor tooth and the formation of a cavity.

2. Means to Solve the Problem

The present inventors have intensively studied so as to achieve the above object and found that, the same cutting sensation as that of a natural tooth is obtained by forming a tooth for a jaw tooth model of a semi-sintered body or gypsum-based material having a specific composition, and when the tooth for a jaw tooth model is provided with standards for evaluating tooth formation in training of dental students, the right and wrong of the formation of an anchor tooth and the formation of a cavity can be easily evaluated without need of an expensive equipment or high-level skill.

Namely, the present invention provides:

(1) A tooth for a jaw tooth model to be used for therapeutic practices in the oral cavity, the tooth being formed of a semi-sintered body or a gypsum-based material;

(2) The tooth for a jaw tooth model according to the above-described (1), wherein the semi-sintered body is selected from the group consisting of alumina-based, zirconia-based and silica-based semi-sintered bodies or a combination thereof;

(3) The tooth for a jaw tooth model according to the above-described (2), wherein the semi-sintered body is formed of alumina silicate;

(4) The tooth for a jaw tooth model according to any one of the above-described (1) to (3), wherein the tooth has a composition containing 5 to 40% by weight of $Al_2O_3$, 40 to 90% by weight of $SiO_2$, and 1 to 15% by weight of at least one of sodium oxide, potassium oxide and lithium oxide;

(5) The tooth for a jaw tooth model according to the above-described (1) or (2), wherein the tooth has a composition containing 100% by weight of $Al_2O_3$;

(6) The tooth for a jaw tooth model according to any one of the above-described (1) to (5), which is formed using a CIM technique;

(7) A tooth for a jaw tooth model provided with standards for evaluating tooth formation, which is used for therapeutic practices in the oral cavity, wherein the tooth includes a non-deletable shape part, a deletable shape part and a forming interface part;

(8) The tooth for a jaw tooth model provided with standards for evaluating tooth formation according to the above-described (6), wherein an interfacial shape between the non-deletable shape part and the forming interface part of the tooth is a minimum anchor tooth shape upon the formation of an anchor tooth, and an interfacial shape between the deletable shape part and the forming interface part is a maximum anchor tooth shape upon the formation of an anchor tooth;

(9) The tooth for a jaw tooth model provided with standards for evaluating tooth formation according to the above-described (6), wherein an interfacial shape between the non-deletable shape part and the forming interface part of the tooth is a minimum cavity shape upon the formation of a cavity, and an interfacial shape between the deletable shape part and the forming interface part is a maximum cavity shape upon the formation of a cavity;

(10) The tooth for a jaw tooth model provided with standards for evaluating tooth formation according to any one of the above-described (7) to (9), wherein the forming interface part has a composition which is different from that of at least one of the non-deletable shape part and the deletable shape part;

(11) The tooth for a jaw tooth model provided with standards for evaluating tooth formation according to any one of the above-described (7) to (9), wherein the forming interface part contains a fluorescent agent;

(12) An apparatus for confirming tooth formation to be used in a jaw tooth model which is provided with standards for evaluating tooth formation, for confirmation of a formation state of the tooth for a jaw tooth model to be used for therapeutic practices in the oral cavity according to the above-described (11), the apparatus comprising:

a casing for encasing a tooth for a jaw tooth model, and a lamp having an absorption wavelength region of a phosphorescent pigment to be used for confirming a forming state of the tooth for a jaw tooth model;

(13) The tooth for a jaw tooth model provided with standards for evaluating tooth formation according to the above-described (6), which is formed by using a multi-layer molding technique;

(14) The tooth for a jaw tooth model provided with standards for evaluating tooth formation according to the above-described (7), wherein the non-deletable shape part and the deletable shape part are formed and an adhesive layer for bonding the non-deletable shape part and the deletable shape part is used as the forming interface part;

(15) The tooth for a jaw tooth model provided with standards for evaluating tooth formation according to the above-described (14), which has a film thickness control part for controlling a thickness of the forming interface part at the interface of bonding between the non-deletable shape part and the deletable shape part according to the above-described (14);

(16) The tooth for a jaw tooth model provided with standards for evaluating tooth formation according to the above-described (14), which includes a film thickness control member in the adhesive layer of the forming interface part according to the above-described (14) so as to control the thickness of the forming interface part;

(17) A method for producing a tooth for a jaw tooth model provided with standards for evaluating-tooth formation, the method comprising injection-molding a non-deletable shape part and a deletable shape part using a CIM technique; bringing the non-deletable shape part into contact with the deletable shape part at a forming interface part; and subjecting to degreasing and baking steps to produce a tooth for a jaw tooth model;

(18) A tooth for a jaw tooth model provided with standards for evaluating tooth formation, wherein a non-deletable shape part, a deletable shape part and a forming interface part have the same compositions as those of the tooth for a jaw tooth model according to any one of the above-described (1) to (6), except that the forming interface part contains a fluorescent dye material; and

(19) A tooth for a jaw tooth model provided with standards for evaluating tooth formation to be used for therapeutic practices in the oral cavity, the tooth comprising a non-deletable shape part and a deletable shape part.

The tooth for a jaw tooth model to be used for therapeutic practices in the oral cavity of the present invention can form any kind of teeth including permanent teeth in upper and lower jaws, such as central incisor teeth, lateral incisor teeth, canine teeth, premolar teeth and molar teeth, and also can form a proper tooth for a jaw tooth model according to the development of lesion such as dental caries, and the kinds of the surgical operation. Similarly, the tooth for a jaw tooth model can form any kind of teeth including milk-teeth in upper and lower jaws, such as central incisor teeth, lateral incisor teeth, canine teeth and premolar teeth.

DESCRIPTION OF REFERENCE NUMERALS

Figure 1:
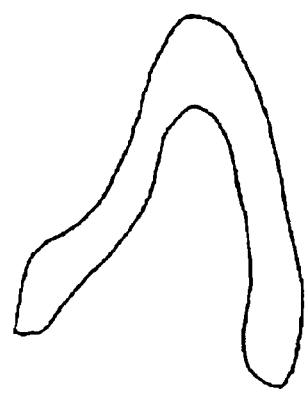
FIG. 1 is a sectional view showing a non-deletable shape part of a tooth form for formation of an anchor tooth.

1: Black light
2: Casing
3: Tooth for a jaw tooth model provided with standards for evaluating tooth formation

DETAILED DESCRIPTION OF THE INVENTION

The present invention relates to a tooth for a jaw tooth model to be used for therapeutic practice in the oral cavity, and the jaw part and the mannequin part with which the tooth should be provided can be appropriately selected when used actually. It is important to institute treatments to confirm adaptability during selection. For example, it is important to appropriately match the size of a tooth insertion inlet.

First Aspect

In a first aspect of the present invention, a tooth for the entire jaw tooth model of the present invention is formed of a semi-sintered body or a gypsum-based material.

Semi-sintered body means an unsintered baked body formed of a polycrystalline inorganic powder. The semi-sintered body used in the present invention is formed of ceramics such as alumina-based, zirconia-based, silica-based, aluminum nitride or silicon nitride ceramics, or a mixture thereof. As long as a cutting sensation of an alumina baked body is not adversely affected, metal oxide-such as silica can be added to the composition of the tooth.

When the semi-sintered body is composed of a single component, it is preferred that the semi-sintered body is entirely (100%) composed of alumina ($Al_2O_3$).

When the semi-sintered body is composed of plural components, for example, the composition of the tooth preferably includes 5 to 40% of $Al_2O_3$ and 40 to 90% of $SiO_2$, more preferably 20 to 35% of $Al_2O_3$ and 45 to 70% of $SiO_2$, and still more preferably 25 to 33% of $Al_2O_3$ and 55 to 65% of $SiO_2$. Percentages as used herein are by weight unless otherwise specified.

It is preferred to add at least one of sodium oxide, potassium oxide and lithium oxide to the system of plural components in the amount of 1 to 15%, and more preferably 3 to 10%.

Other components are not particularly limited as long as they can impart cutting properties similar to those of a natural tooth. For example, it is possible to appropriately add boric acid, phosphoric acid, sodium oxide, potassium oxide, lithium oxide, lime, magnesia, strontium oxide, barium oxide, lead oxide, titania, zinc oxide, zirconia and the like. Furthermore, soda, potassium oxide and lithium oxide can also be added so as to decrease a melting point.

It is preferred to appropriately add auxiliary raw materials such as burnt ocher, cobalt trioxide, nickel oxide, potassium dichromate, chromium oxide, manganese dioxide, potassium permanganate, vanadium pentoxide, metallic selenium, sodium selenite, cupric oxide, copper sulfate, cuprous oxide, gold chloride, silver nitrate, sublimed sulfur, sodium sulfide, fluorite, sodium fluorosilicate and apatite. It is more preferred to add fluorite, sodium fluorosilicate and apatite.

The tooth for a jaw tooth model of the present invention is preferably formed by using a CIM technique.

The CIM technique is a forming technique comprising the steps of:

(1) kneading an inorganic power with a resin such as thermoplastic resin or wax (which is thermally decomposed at about 1,000° C. or lower) to form pellets;

(2) making a die for an injection molding having a given shape and injection-molding the pellets obtained in the step (1);

(3) removing the resin through degreasing (decomposing a resin component by raising the temperature) after molding; and (4) baking the remained powdered inorganic material until a form can be imparted. A method of producing a tooth using this technique is a most suitable method in view of moldability.

When the semi-sintered body is composed of a single component such as alumina, the tooth of the present invention is baked from an $Al_2O_3$ powder having a primary particle diameter of 1.0 to 8.0 μm, preferably a primary particle diameter of 2.0 to 5.0 μm, and more preferably a primary particle diameter of 2.0 to 3.0 μm. The baking temperature is set within a range from 1,300 to 1,600° C., and preferably from 1,400 to 1,600° C. The baking temperature has a close relation with cutting sensation and must be adjusted according to the particle size and raw material lot. Similarly, the retention time at the baking temperature also has a close relation with cutting sensation and must be adjusted according to the particle size and raw material lot.

Gypsum-based material means gypsum, hard gypsum, ultra-hard gypsum or the like, and is preferably hard gypsum or ultra-hard gypsum.

Second Aspect

In a second aspect of the present invention, a jaw tooth model provided with standards for evaluating tooth formation to be used for therapeutic practices in the oral cavity is a tooth used for simulation of an intraoral remedial procedure or practice treatment using a jaw tooth model in a university. The present invention relates a tooth formed by cutting. A jaw tooth model provided with standards for evaluating tooth formation relates to a tooth used for the formation of a cavity or the formation of an anchor tooth.

The expression "provided with standards for evaluating tooth formation" in the jaw tooth model provided with standards for evaluating tooth formation means inclusion of means capable of judging whether or not predetermined cutting is satisfactorily performed.

The jaw tooth model includes, as standards for evaluating tooth formation, identification of the non-deletable shape part, deletable shape part and forming interface part by coloring, or coloring of each port with the same color and inclusion of a fluorescent dye material in a portion of them, and the like.

Non-deletable shape part of the tooth means the tooth part which should not be deleted during training of dental students and the like, and can have various sizes and shapes on the assumption of the kind of teeth, kinds of treatments and degrees of lesion. In other words, the non-deletable shape part of the tooth is a form before mounting a prosthetic appliance when the tooth is treated in the oral cavity, namely, a form of the tooth after the formation of an anchor tooth during the formation of an anchor tooth, or a form of the tooth after the formation of a cavity in the case of the formation of a cavity.

There is a tolerance with respect to the form of the cavity and anchor tooth formed. The form preferably has a tolerance which is as small as possible. It is preferred that the non-deletable shape part of the tooth has a maximum state during formation of a cavity and formation of an anchor tooth, and that its form is the form of the tooth which achieves ideal formation of a cavity or formation of an anchor tooth.

Deletion forming part of the tooth means the tooth part which should be deleted during training of dental students and the like, and can have various sizes and shapes depending on the kind of teeth, kind of treatments and degree of lesion. In other words, the deletable shape part of the tooth is the part where a form before mounting a prosthetic appliance was removed from a form after mounting a prosthetic appliance when the tooth is treated in the oral cavity. Namely, it is a part in which a form after the formation of an anchor tooth is deleted from a form before the formation of an anchor tooth in the case of the formation of an anchor, while in the case of the formation of a cavity it is a part in which a form after the formation of a cavity is deleted from a form before the formation of an anchor tooth. In contrast to the non-deletable shape part, the deletable shape part is preferably a form of the tooth which achieves ideal formation of a cavity or formation of an anchor tooth at a minimum form.

It is preferred that the interfacial shape between the non-deletable shape part and the forming interface part of the tooth is a minimum anchor tooth shape upon the formation of an anchor tooth, and the interfacial shape between the deletable shape part and the forming interface part is a maximum anchor tooth shape upon the formation of an anchor tooth.

It is preferred that the interfacial shape between the non-deletable shape part and the forming interface part of the tooth is a minimum cavity shape upon the formation of a cavity, and the interfacial shape between the deletable shape part and the forming interface part is a maximum cavity shape upon the formation of a cavity.

The forming interface part of the tooth means an interfacial part between the non-deletable shape part which should not be deleted and the deletable shape part which should be deleted, by practices of dental students and the like. In other words, the forming interface part of the tooth means a part which fills the interface when the non-deletable shape part of the tooth and the deletable shape part of the tooth are joined. This part deletes the deletable shape part when formation of an anchor tooth or the formation of a cavity are performed, and serves as a cutting surface when the object of formation of an anchor tooth or the formation of a cavity is performed.

Overall, the non-deletable shape part, the forming interface part and the deletable shape part of the tooth are sequentially laminated from the tooth root direction.

The object of the present invention can be achieved only by the non-deletable shape part and the deletable shape part. It is possible to contain a pigment, a fluorescent dye material or the like according to the purposes of practices without clearly or completely recognizing.

It is preferred to have a film thickness control part for controlling a thickness of the forming interface part at an adhesive interface of the non-deletable shape part and the deletable shape part.

When the non-deletable shape part and the deletable shape part of the tooth are previously formed or temporarily formed and the forming interface part is provided later, it is preferred to provide, as the film thickness control part, a raised part or a protrusion part for defining a thickness at one or both of the non-deletable shape part and the deletable shape part so as to defined the thickness. The protrusion part is more preferred.

When the raised part or protrusion part is provided, this part is exposed on the cutting face upon the formation of an anchor tooth or the formation of a cavity.

Similarly, a material constituting the forming interface part can contain a filler for deciding a forming thickness so as to define a thickness of the forming interface part. For example, a forming interface part having a thickness of about 100 µm can be obtained by mixing an alumina filler of about 100 µm with the material constituting the forming interface part and interposing between the non-deletable shape part and the deletable shape part.

The non-deletable shape part, deletable shape part and forming interface part, which constitute the tooth of the present invention, can contain a pigment or a fluorescent dye material, or the like so as to enable therapeutic practices according to the purposes of a practical session without clear or complete recognition of each part, or completely without recognition by dental students and the like.

According to the above purposes, the forming interface part can be formed of the material having a composition which is different from that of at least one of the non-deletable shape part and the deletable shape part. Furthermore, the forming interface part can be formed of the material having the composition which is the same as that of the deletable shape part and is also different from that of the non-deletable shape part. The forming interface part can be formed of the material having the composition which is different from that of the non-deletable shape part and the deletable shape part. It is preferred that the composition of the non-deletable shape part, that of the deletable shape part and that of the forming interface part are the same.

Examples of the different material include the following combinations.

TABLE 1

|  |  | Combination 1 | Combination 2 | Combination 3 | Combination 4 | Combination 5 | Combination 6 | combination 7 |
|---|---|---|---|---|---|---|---|---|
| Non-deletable shape part | Ceramics | * | * | * |  |  |  |  |
|  | Thermoplastic resin |  |  |  | * | * |  |  |
|  | Thermocurable resin |  |  |  |  |  | * | * |
| Forming interface part | Ceramics | * |  |  | * | * |  | * |
|  | Thermoplastic resin |  |  |  |  |  |  |  |
|  | Thermocurable resin |  |  | * |  | * |  | * |

TABLE 1-continued

|  |  | Combination 1 | Combination 2 | Combination 3 | Combination 4 | Combination 5 | Combination 6 | combination 7 |
|---|---|---|---|---|---|---|---|---|
| Deletable forming part | Ceramics | * | * |  | * | * | * | * |
|  | Thermoplastic resin |  |  |  |  |  |  |  |
|  | Thermocurable resin |  |  | * |  |  |  |  |

The symbol * denotes components contained in each part.

It is preferred to use, in addition to the above, a polymerization method such as chemical polymerization.

The jaw tooth model provided with standards for evaluating tooth formation of the present invention is produced by a preferable combination such as a combination of ceramics and a chemically polymerizable resin.

In one specific example of the above second aspect, the present invention relates to a tooth for a jaw tooth model provided with standards for evaluating tooth formation in which the non-deletable shape part and the deletable shape part are formed and an adhesive layer for bonding the non-deletable shape part and the deletable shape part is used as the forming interface part.

Namely, the non-deletable shape part and the deletable shape part formed of ceramics are joined using a resin, and thus an adhesive layer can be used as a forming interface part.

The resin used in the adhesive layer is a thermocurable resin, a thermoplastic resin or a chemically polymerizable resin, and is preferably a thermocurable resin or a chemically polymerizable resin. Furthermore, a melamine resin and an epoxy resin are preferred.

The resin may be any joining material capable of joining, and cement or gypsum may be used in place of the resin.

The tooth of the present invention can be formed of ceramics such as alumina-based, zirconia-based, silica-based, aluminum nitride or silicon nitride ceramics, or a mixture thereof, or a gypsum-based material.

The ceramics are preferably in the form of a semi-sintered body, and particularly preferably an alumina semi-sintered body. The composition of the tooth is preferably alumina silicate.

The composition of the tooth preferably includes 5 to 40% of $Al_2O_3$ and 40 to 90% of $SiO_2$, more preferably 20 to 35% of $Al_2O_3$ and 45 to 70% of $SiO_2$, and still more preferably 25 to 33% of $Al_2O_3$ and 55 to 65% of $SiO_2$. When the semi-sintered body is composed of a single component, it is preferred that the semi-sintered body is entirely (100%) composed of alumina ($Al_2O_3$).

It is preferred to add at least one of sodium oxide, potassium oxide and lithium oxide to the system of plural components in the amount of 1 to 15%, and more preferably 3 to 10%.

As shown in the first aspect of the present invention, it is possible to appropriately add other components such as boric acid, phosphoric acid, sodium oxide, potassium oxide, lithium oxide, lime, magnesia, strontium oxide, barium oxide, lead oxide, titania, zinc oxide and zirconia. Furthermore, soda, potassium oxide and lithium oxide can also be added so as to decrease a melting point.

As shown in the first aspect of the present invention, it is possible to appropriately add auxiliary raw materials such as burnt ocher, cobalt trioxide, nickel oxide, potassium dichromate, chromium oxide, manganese dioxide, potassium permanganate, vanadium pentoxide, metallic selenium, sodium selenite, cupric oxide, copper sulfate, cuprous oxide, gold chloride, silver nitrate, sublimed sulfur, sodium sulfide, fluorite, sodium fluorosilicate and apatite. It is possible to add fluorite, sodium fluorosilicate and apatite to the non-deletable shape part and the deletable shape part.

Although the compositions of the non-deletable shape part, deletable shape part and forming interface part of the present invention can be appropriately selected according to the proposes of practices of students under dental training. For example, it is preferred that the deletable shape part is formed of ceramics, and the non-deletable shape part and the deletable shape part are formed of ceramics.

Cutting sensation similar to that of a natural tooth can be obtained by forming the cutting part of ceramics.

It is preferred to use a CIM technique in the method of molding ceramics.

Using a CIM technique, a non-deletable shape part, a forming interface part and a deletable shape part are formed by a multi-layer molding technique, and thus the tooth of the present invention can be obtained.

Furthermore, a non-deletable shape part and a deletable shape part are injection-molded, and the non-deletable shape part and the deletable shape part baked through degreasing and baking steps are brought into contact with each other at an interface using a thermocurable resin or a chemically polymerizable resin to form a forming interface part.

Using a CIM technique, multi-layer molding is performed to form a forming interface part and a deletable shape part of the present invention, and then a non-deletable shape part formed of a thermocurable resin, a chemically polymerizable resin or a thermoplastic resin may be bonded.

The method of producing using a CIM technique includes, for example, a method for producing a tooth for a jaw tooth model provided with standards for evaluating tooth formation, which comprises injection-molding a non-deletable shape part and a deletable shape part, and bringing the non-deletable shape part into contact with the deletable shape part at a forming interface part, followed by subjecting to degreasing and baking steps to produce a tooth for a jaw tooth model. The forming interface part can be injection-molded.

The material of the forming interface part may be a mud material prepared by kneading a ceramics powder with the same composition as that of the non-deletable shape part and the deletable shape part with water.

The thermoplastic resin means a resin which can be provided with thermoplasticity which enables molding by heating, while the thermocurable resin means a resin which is cured by the progress of crosslinking as a result of heating. For example, it is possible to appropriately use styrene-based, olefin-based, vinyl chloride-based, urethane-based, polyamide-based, polybutadiene-based, polyacetal-based, saturated polyester-based, polycarbonate, polyphenylene ether resins and the like.

It is also possible to appropriately use polysulfone-based, polyimide, polyetherimide, polyether ether ketone resins and the like.

Among these resins, styrene-based, urethane-based, polyamide-based, polyacetal-based, saturated polyester-based and polycarbonate resins are preferred.

A thermocurable resin does not dissolve in a solvent after processing and is not softened even when reheated. A urea resin, a melamine resin, a phenol resin and an epoxy resin can be typically used, and a melamine resin and an epoxy resin are preferred.

The chemically polymerizable resin is originally a resin which is contained in a thermocurable resin or a thermoplastic resin, and is polymerized using a chemical catalyst. Particularly preferred is a resin which contains a crosslinking agent and has not thermoplasticity.

Among the thermocurable resin, thermoplastic resin and chemically polymerizable resin, the thermoplastic resin and the chemically polymerizable resin are preferred.

It is particularly preferred that a non-deletable shape part, a deletable shape part and a forming interface part exist in combination.

The non-deletable shape part may be formed of any of a thermocurable resin, a thermoplastic resin and a chemically polymerizable resin. In the case where the tooth of the present invention is dissolved when entered into the non-deletable shape part from the forming interface part and thus it is necessary to issue a warning, the thermoplastic resin is preferably used. However, in general practical uses of the jaw tooth model such as test and storage of practical experiences, the thermocurable resin and the chemically polymerizable resin are preferably used.

The deletable shape part may be formed of any of the thermocurable resin, thermoplastic resin and chemically polymerizable resin, similarly to the non-deletable shape part. In general practical uses of the jaw tooth model, the thermocurable resin and the chemically polymerizable resin can also be used.

The forming interface part may be formed of the thermocurable resin and the chemically polymerizable resin.

The non-deletable shape part, deletable shape part and forming interface part may be appropriately formed of the thermocurable resin or chemically polymerizable resin.

It is possible to appropriately blend those which are usually used for molding of the resin.

These resin components can contain pigments, inorganic fillers, organic fillers, inorganic and organic composite fillers.

Examples of inorganic fillers include quartz, amorphous silica, ultrafine silica particles, silicon nitride, silicon carbide, boron carbide and the like. An average particle diameter of these inorganic fillers is not particularly limited, and is preferably within a range from 0.001 to 100 μm, and more preferably from 0.01 to 10 μm. Among these inorganic fillers, ultrafine silica particles such as AEROSIL or ultrafine silica composite particles can be used. Specific examples of AEROSIL include AEROSIL 200, AEROSIL OX50, AEROSIL R972, AEROSIL R974, AEROSIL R8200, AEROSIL R711, AEROSIL DT4, aluminum oxide C, titanium dioxide P25 and the like.

The organic filler can be obtained by polymerizing a monomer having a polymerizable group. Specific examples of the organic filler include those obtained by polymerizing unsaturated aromatics such as styrene, a-methylstyrene, halogenated styrene and divinylbenzene; unsaturated esters such as vinyl acetate and vinyl propionate; unsaturated nitrites such as acrylonitrile; and polymerizable monomers such as butadiene and isoprene; alone or polymerizing several kinds of them. The average particle diameter of these organic fillers is preferably within a range from 1 to 100 μm, and more preferably from 3 to 50 μm.

It is also possible to use fillers of organic and inorganic composite, which contain inorganic particles in an organic polymer.

In order to show completion of the formation of a cavity or the formation of an anchor tooth in the forming interface part, the forming interface part preferably contains a pigment or fluorescent agent which is different from that of the non-deletable shape part and deletable shape part. It goes without saying, the non-deletable shape part and the deletable shape part can contain a pigment or fluorescent agent which can shows a difference with the forming interface part. The forming interface part preferably contains a fluorescent pigment.

As the fluorescent agent of the present invention, a fluorescent pigment, a fluorescent dye and a fluorescent resin can also be used. As the fluorescent pigment, either of an organic fluorescent pigment and an inorganic fluorescent pigment may be used. The fluorescent pigment must be appropriately selected according to the base material and the object of practices. Similar to the fluorescent pigment, a light accumulating pigment can also be used.

A UV excitation type fluorescent pigment is preferred.

By making the forming interface part clear by inclusion of the pigment, beginners can easily practice the formation of a cavity and the formation of an anchor tooth.

By making the forming interface part clear by inclusion of the fluorescent pigment, the level of skill of the formation of a cavity and the formation of an anchor tooth can be easily confirmed by a test.

The apparatus for confirming the molding degree of the tooth for a jaw tooth model provided with standards for evaluating tooth formation of the present invention is an apparatus for confirming tooth formation to be used in a jaw tooth model which is provided with standards for evaluating tooth formation, that is a confirmation apparatus for confirming a formation state of the tooth for a jaw tooth model to be used for therapeutic practices in the oral cavity, the apparatus comprising a casing for encasing a tooth for a jaw tooth model, and an excitation energy generator of a fluorescent agent to be used for conforming a forming state of the tooth for a jaw tooth model. Examples of the excitation energy generator include an X-ray and radiation generator, an ultraviolet ray generator, an electron beam generator, a magnetic field generator and the like. Among these, an ultraviolet ray generator is preferred.

The apparatus for confirming a forming degree of the tooth for a jaw tooth model provided with standards for evaluating tooth formation of the present invention is an apparatus for confirming tooth formation to be used in a tooth for a jaw tooth model which is provided with standards for evaluating tooth formation, that is a confirmation apparatus for confirming a forming state of the tooth for a jaw tooth model to be used for therapeutic practices in the oral cavity, the apparatus comprising a casing for encasing a tooth for a jaw tooth model and a lamp having an absorption wavelength region of a fluorescent agent to be used for confirming a forming state of the tooth for a jaw tooth model.

The lamp having an absorption wavelength region is preferably black light.

It is preferred to confirm a forming degree using an ultraviolet excitation fluorescent agent as the fluorescent agent used for the tooth.

The jaw tooth model provided with standards for evaluating tooth formation of the present invention can be produced using a multi-layer molding technique as the method for forming it.

The first and second aspects of the present invention will now be described in detail by way of Examples, but are not limited thereto, and aspects within the idea and scope defined in the scope of claims for patent are also included in the present invention.

EXAMPLES

When Using Aluminosilicate Tooth
(Casting)

In a pot mill, 100 g of an aluminosilicate powder ($Al_2O_3$: 19%, $SiO_2$: 74%, average particle diameter: 0.15 μm) as a ceramic raw material for a liquid raw material and water as a solvent were mixed, ground and dispersed to prepare a slurry. The resulting slurry was previously cast in a negative gypsum mold having a tooth form and then baked at 1,300° C. to obtain tooth-shaped aluminosilicate semi-sintered bodies.

Characteristics of the resulting tooth-shaped aluminosilicate semi-sintered bodies are shown in Table 2 as Examples Nos. 1 to 4.

(CIM)

In a negative mold having a tooth form, 100 g of aluminosilicate pellets for CIM ($Al_2O_3$: 14%, $SiO_2$: 50%, binder 30%, average particle diameter: 0.15 μm) as a raw material was injection-molded, degreased at 600° C. for 3 hours and then sintered at 1,300° C. to produce teeth.

Characteristics of the resulting teeth are shown in Table 2 as Examples Nos. 5 to 8.

Gypsum Tooth

In a tooth-shaped mold coated with vaseline, a dental ultra-hard gypsum was poured to produce teeth.

Characteristics of the resulting teeth are shown in Table 2 as Examples Nos. 9 to 12.

Semi-sintered Alumina Tooth 700 g of an $Al_2O_3$ powder having a primary particle diameter of 3.0 μm and 300 g (30%) of steric acid were kneaded with heating and then injected in a tooth-shaped mold. The injected compact was degreased at 600° C. for 3 hours and then baked at 1500° C. A retention time at a baking temperature was 15 minutes. As a result of natural air cooling, teeth composed of semi-sintered alumina alone were obtained. Characteristics of the resulting teeth are shown in Table 2 as Examples Nos. 13 to 16. A dental diamond bar was used in a test of characteristics.

TABLE 2

| | Examples | Moldability | Cutting properties | Anchor tooth forming properties | Cavity forming properties |
|---|---|---|---|---|---|
| 1. Semi-sintered aluminisilicate tooth (1) (slurry cast molding) | 1 | B | A | A | A |
| | 2 | B | A | A | A |
| | 3 | B | A | A | A |
| | 4 | B | A | A | A |
| 2. Semi-sintered aluminisilicate tooth (2) (CIM) | 5 | A | A | A | A |
| | 6 | A | A | A | A |
| | 7 | A | A | A | A |
| | 8 | A | A | A | A |
| 3. Gypsum tooth | 9 | A | B | B | B |
| | 10 | A | B | B | B |
| | 11 | A | B | B | B |
| | 12 | A | B | B | B |
| 4. Semi-sintered alumina tooth (single component of alumina) | 13 | A | A+ | A | A |
| | 14 | A | A+ | A | A |
| | 15 | A | A+ | A | A |
| | 16 | A | A+ | A | A |
| Comparative Example Tooth manufactured by SHOFU, INC. | 1 | A | C | C | C |
| Composite type tooth | 2 | A | C | C | C |

(Cutting properties, anchor tooth forming properties and cavity forming properties are evaluated by proximity to a natural tooth. A: Good, B: Ordinary, C: Poor, A+: closer to a natural tooth when compared with Good)

When using ceramic tooth (central incisor tooth form: formation of anchor tooth)
(Gypsum Mold)

A non-deletable shape part and a deletable shape part in a tooth form were formed of wax and then a negative gypsum mold was produced by a lost wax method.

In a pot mill, 100 g of an alumina powder ($Al_2O_3$: 19%, $SiO_2$: 74%, average particle diameter: 0.15 μm) as a ceramic raw material for a liquid raw material and water as a solvent were mixed, ground and then dispersed to prepare a slurry. The resulting slurry was cast in a previously prepared negative gypsum mold having a tooth form and then baked at a temperature of 1,500 to 1,750° C. to obtain tooth-shaped alumina sintered bodes.

Figure 2:
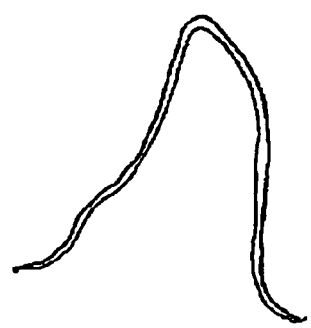
FIG. 2 is a sectional view showing a forming interface part of a tooth form for formation of an anchor tooth.
Figure 3:
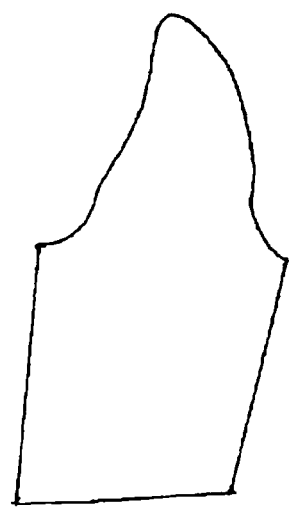
FIG. 3 is a sectional view showing a deletable shape part of a tooth form for formation of an anchor tooth.

A sectional view showing a non-deletable shape part of a tooth form for formation of an anchor tooth is shown in FIG. 1. A sectional view showing a forming interface part of a tooth form for formation of an anchor tooth is shown in FIG. 2. A sectional view showing a deletable shape part of a tooth form for formation of an anchor tooth is shown in FIG. 3.

The non-deletable shape part and the deletable shape part of the resulting tooth-shaped alumina sintered body were joined using an epoxy resin or melamine resin mixed with a black pigment to obtain Example 1 (epoxy resin) and Example 2 (melamine resin). The non-deletable shape part and the deletable shape part of the tooth-shaped alumina sintered body were joined using an epoxy resin or melamine resin mixed with a fluorescent pigment to obtain Example 3 (epoxy resin) and 4 (melamine resin). These results are shown in Table 3 and Table 4, together with the results of the following Examples.

Using a gypsum mold in which raised part (about 100 μm) defining a thickness of a forming interface part is provided on a lingual surface and a labial surface on the joining surface of a deletable shape part, specimens were produced in the same manner as in Examples 1 to 4, and Examples 11 to 14 were carried out.

Teeth for a jaw tooth model provided with standards for evaluating tooth formation to be used to form a cavity of a first molar tooth were produced in the same manner as in Examples 1 to 4 to obtain teeth for a jaw tooth model of Example 21 to 24.

Using a gypsum mold in which a raised part (about 100 μm) defining a thickness of a forming interface part is provided on the joining surface of a deletable shape part of a tooth for a jaw tooth model provided with standards for evaluating tooth formation to be used to form a cavity of a first molar tooth, specimens were produced in the same manner as in Examples 1 to 4 to obtain Examples 31 to 34.

(CIM)

Using a CAD technique, a mold of a non-deletable shape part and a deletable shape part in a tooth form was removed and a mold having the objective shape was produced.

In a mold having a tooth form, 100 g of alumina pellets for CIM ($Al_2O_3$: 19%, $SiO_2$: 74%, average particle diameter: 0.15 μm) as a raw material was injection-moiled to obtain an injection-molded article.

The resulting injection-molded articles each having a shape of a non-deletable shape part and a shape of a deletable shape part were joined using a muddy alumina powder mixed with vaseline.

After joining, degreasing at 600° C. for 3 hours and further semi-sintering at 1,300° C., teeth were produced.

In the same manner, except for adding a black pigment and a fluorescent pigment in vaseline used for joining, teeth of Example 5 (black pigment) and Example 6 (fluorescent pigment) were obtained.

Using a gypsum mold in which a raised part (about 100 μm) defining a thickness of a forming interface part is provided on a lingual surface and a labial surface on the joining surface of a deletable shape part, specimens were produced in the same manner as in Examples 5 and 6, and Examples 15 and 16 were carried out.

Teeth for a jaw tooth model provided with standards for evaluating tooth formation to be used to form a cavity of a first molar tooth were produced in the same manner as in Examples 7 and 8, teeth for a jaw tooth model of Example 25 and 26 were obtained.

Using a gypsum mold in which a raised part (about 100 μm) defining a thickness of a forming interface part is provided on the joining surface of a deletable shape part of a jaw tooth model provided with standards for evaluating tooth formation to be used to form a cavity of a first molar tooth, specimens were produced in the same manner as in Examples 5 and 6 to obtain specimens of Examples 35 and 36.

When using epoxy tooth (central incisor tooth form: formation of anchor tooth)

(Mold)

Using a CAD technique, a mold of a non-deletable shape part and a deletable shape part in a tooth form were removed and a mold having the objective shape was produced.

An epoxy resin and a curing agent were kneaded, poured in a mold coated with a mold releasant and then allowed to stand for 24 hours to obtain a compact.

The compacts each having a non-deletable shape part and a deletable shape part were joined using a mixture prepared by kneading an epoxy resin and a curing agent to obtain teeth.

In the same manner, except for adding a black pigment and a fluorescent pigment in the epoxy resin used for joining, teeth of Example 7 (black pigment) and Example 8 (fluorescent pigment) were obtained.

Using a gypsum mold in which a raised part (about 100 μm) defining a thickness of a forming interface part is provided on a lingual surface and a labial surface on the joining surface of a deletable shape part, specimens were produced in the same manner as in Examples 7 and 8 to obtain specimens of Examples 17 and 18.

Teeth for a jaw tooth model provided with standards for evaluating tooth formation to be used to form a cavity of a first molar tooth were produced in the same manner as in Examples 7 and 8 to obtain teeth for a jaw tooth model of Examples 27 and 28.

Using a gypsum mold in which a raised part (about 100 μm) defining a thickness of a forming interface part is provided on the joining surface of a deletable shape part of a jaw tooth model provided with standards for evaluating tooth formation to be used to form a cavity of a first molar tooth, specimens were produced in the same manner as in Examples 7 and 8 to obtain specimens of Examples 37 and 38.

When using melamine tooth (central incisor tooth form: formation of anchor tooth)

(Mold)

Using a CAD technique, a mold of a non-deletable shape part and a deletable shape part in a tooth form were removed and a mold having the objective shape was produced.

A melamine resin and a curing agent were kneaded, poured in a mold coated with a mold releasant and then allowed to stand for 24 hours to obtain a compact.

The compacts each having a non-deletable shape part and a deletable shape part were joined using a mixture prepared by kneading a melamine resin and a curing agent to obtain teeth.

In the same manner, except for adding a black pigment and a fluorescent pigment in the melamine resin used for joining, teeth of Example 9 (black pigment) and Example 10 (fluorescent pigment) were obtained.

Using a gypsum mold in which a raised part (about 100 μm) defining a thickness of a forming interface part is provided on a lingual surface and a labial surface on the joining surface of a deletable shape part, specimens were produced in the same manner as in Examples 9 and 10, and Examples 19 and 20 were carried out.

Teeth for a jaw tooth model provided with standards for evaluating tooth formation to be used to form a cavity were produced in the same manner as in Example 9 and 10 to obtain teeth for a jaw tooth model of Examples 29 and 30.

Figure 4:
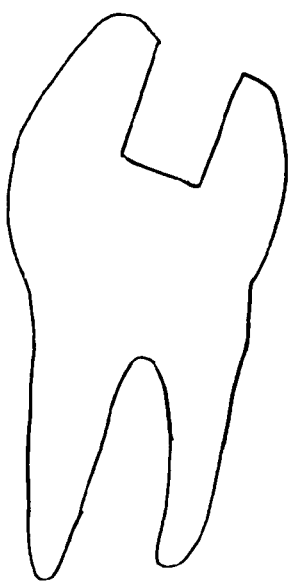
FIG. 4 is a sectional view showing a non-deletable shape part of a tooth form for formation of a cavity.
Figure 5:
FIG. 5 is a sectional view showing a forming interface part of a tooth form for formation of a cavity.
Figure 6:
FIG. 6 is a sectional view showing a deletable shape part of a tooth form for formation of a cavity.
Figure 7:
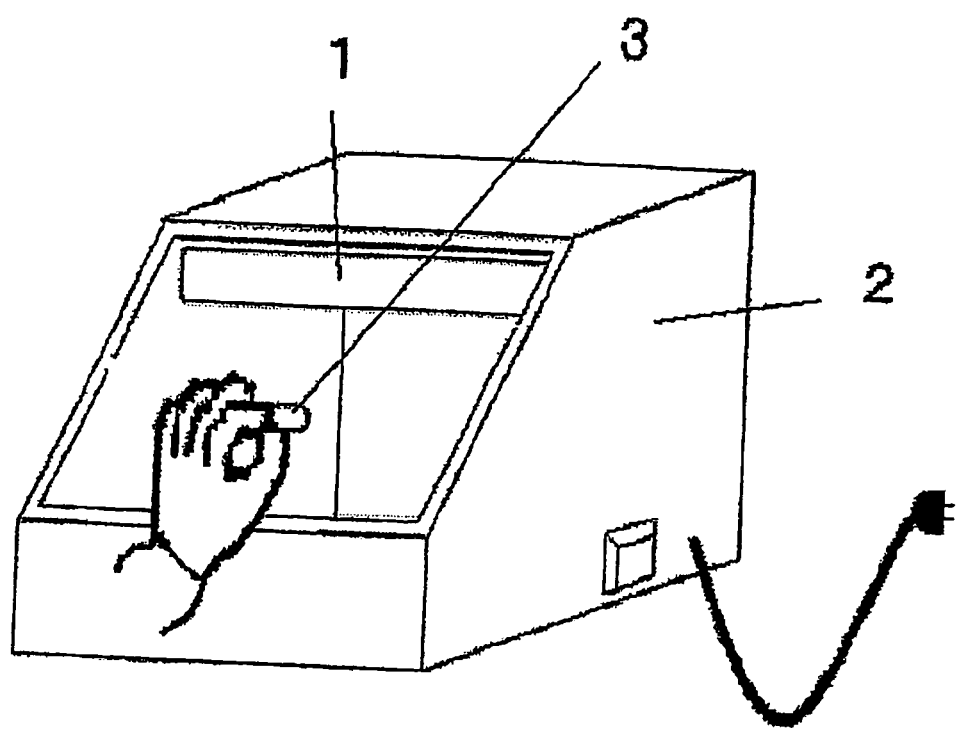
FIG. 7 is a schematic view showing an apparatus for confirming tooth formation to be used in a jaw tooth model which is provided with standards for evaluating tooth formation.

A sectional view showing a non-deletable shape part of a tooth form for formation of a cavity is shown in FIG. 4. A sectional view showing a forming interface part of a tooth form for formation of a cavity is shown in FIG. 5. A sectional view showing a deletable shape part of a tooth form for formation of a cavity is shown in FIG. 6.

Using a gypsum mold in which a raised part (about 100 µm) defining a thickness of a forming interface part is provided on the joining surface of a deletable shape part of a jaw tooth model provided with standards for evaluating tooth formation to be used to form a cavity of a first molar tooth, specimens were produced in the same manner as in Examples 9 and 10 to obtain specimens of Examples 39 and 40.

When Using Semi-sintered Alumina Tooth (Central Incisor Tooth Form: Formation of Anchor Tooth)

700 g of an $Al_2O_3$ powder having a primary particle diameter of 3.0 µm and 300 g (30%) of steric acid were kneaded with heating and then injected in molds each having shapes of a non-deletable shape part and a deletable shape part of the tooth. The forming interface part of the tooth was formed by injecting a mixture prepared by adding 50 mg of a pigment (iron oxide) to the above $Al_2O_3$ powder and steric acid on a non-deletion forming par in a thickness of 70 µm. After joining the deletable shape part on the forming interface part, the injected compact was degreased at 600° C. for 3 hours and then baked at 1,500° C. A retention time at a baking temperature was 15 minutes. As a result of natural air cooling, a tooth composed of alumina alone was obtained in the same manner, except that the forming interface part contains a fluorescent pigment. Characteristics of the resulting tooth are shown in Table 4 as Example No. 41.

Using a gypsum mold in which a raised part (about 100 µm) defining a thickness of a forming interface part is provided on the joining surface of a deletable shape part of a jaw tooth model provided with standards for evaluating tooth formation to be used to form a cavity of a first molar tooth, a specimen was produced in the same manner as in Example 41 to obtain a specimen of Example 42.

Commercially available epoxy, melamine and hard resin teeth for a jaw tooth model were used as teeth for a jaw tooth model of Comparative Examples 1 to 3.

The fluorescent pigment used in Examples emits fluorescence under exposure to black light.

TABLE 3

| Examples | Forming properties | Cutting properties | Ease of evaluation |
| --- | --- | --- | --- |
| 1 | A | A | A |
| 2 | A | A | A |
| 3 | A | A | A |
| 4 | A | A | A |
| 5 | A | A | A |
| 6 | A | A | A |
| 7 | B | B | A |
| 8 | B | B | A |
| 9 | B | B | A |
| 10 | B | B | A |
| 11 | A | A | A |
| 12 | A | A | A |
| 13 | A | A | A |
| 14 | A | A | A |
| 15 | A | A | A |
| 16 | A | A | A |
| 17 | B | B | A |
| 18 | B | B | A |
| 19 | B | B | A |
| 20 | B | B | A |

A: Good
B: Ordinary
C: Poor

TABLE 4

| Examples | Forming properties | Cutting properties | Ease of evaluation |
| --- | --- | --- | --- |
| 21 | A | A | A |
| 22 | A | A | A |
| 23 | A | A | A |
| 24 | A | A | A |
| 25 | A | A | A |
| 26 | A | A | A |
| 27 | B | B | A |
| 28 | B | B | A |
| 29 | B | B | A |
| 30 | B | B | A |
| 31 | A | A | A |
| 32 | A | A | A |
| 33 | A | A | A |
| 34 | A | A | A |
| 35 | A | A | A |
| 36 | A | A | A |
| 37 | B | B | A |
| 38 | B | B | A |
| 39 | B | B | A |
| 40 | B | B | A |
| 41 | A | A | A |
| 42 | A | A | A |
| Comparative Example 1 | B | B | C |
| Comparative Example 2 | B | B | C |
| Comparative Example 3 | C | C | C |

A: Good
B: Ordinary
C: Poor

The apparatus for confirming tooth formation to be used in a jaw tooth model which is provided with standards for evaluating tooth formation of the present invention will now be described in detail.

After forming a cap for encasing a jaw tooth model provided with standards for evaluating tooth formation by cutting off a portion of a casing, an umbrella for a fluorescent lamp, capable of mounting a black light fluorescent lamp 4 W (FL4BLB-toshiba, size: 134.5 mm (tube length)×15.5 mm (tube diameter)) therein, was colored black and then attached.

A cord capable of supplying a power from outside and a switch for a black light were provided on the outside of the casing. A test of ease of evaluation of the apparatuses of the above Examples was performed.

Industrial Applicability

By forming an anchor tooth and a cavity using the tooth of the present invention, it is possible to quickly experience the same cutting sensation as that of a natural tooth and to easily experience the formation of them.

Also, it is possible to learn a technique of forming them. The tooth for a jaw tooth model is a substitute for a hardest natural tooth in the human body and a tooth formed from a conventional material exhibits a soft feel upon cutting, whereas, the tooth for a jaw tooth model according to the present invention can exhibit cutting properties similar to that of a natural tooth. It is possible to experience cutting sensation similar to that when using an intraoral diamond cutting material (using an air turbine) rotating at a high speed of 400,000 rpm.

Since the injection molding is contacted with a cutting material rotating at a high speed and therefore adaptability between the tooth and the jaw is important, a CIM technique capable of accurately forming is preferably used. Sufficient moldability could not be obtained by another cast molding.

The shape of a dental crown of the tooth model is also important and it is important to serve as a target of anchor tooth formation and cavity preparation and to accurately express a raised part, fossa and cusp, and thus molding using a CIM technique is suitable.

Since the tooth of the present invention can be colored white, ivory, milky-white or translucent, like a natural tooth, it is possible to experience more realistic cutting.

The degree of formation can be easily evaluated by forming an anchor tooth or a cavity using the tooth of the present invention.

It is not easy to evaluate the level of the formation of several tens of students in lesson and the like and the evaluating operation requires considerable time. However, according to the present invention, the students themselves can confirm a state of the formation and also can revise the form. Furthermore, when excellent students practice so as to learn a higher level of a technique and to quickly learn as compared with other students, the student can easily practice repeatedly alone.

Furthermore, it is possible to confirm the state of the formed article during the formation and to grasp the degree of the formation and the state of the forming step.

Even when a number of students are simultaneously tested, it is possible to easily evaluate using an apparatus for confirming tooth formation to be used in a jaw tooth model which is provided with standards for evaluating tooth formation without evaluating forming properties by the teacher himself. According to the present invention, it is possible to uniformly evaluate since there is not a significant difference in evaluation between universities.

When using the tooth with preferred composition of the present invention, it is possible to easily experience formation with the same cutting sensation as that of a natural tooth. Also, it is possible to learn a technique of forming them.

The tooth for a jaw tooth model is a substitute for a hardest natural tooth in the human body and a tooth formed from a conventional material exhibits a soft feel upon cutting, whereas the tooth for a jaw tooth model according to the present invention can exhibit cutting sensation similar to that of a natural tooth. It is possible to experience cutting sensation similar to that when using an intraoral diamond cutting material (using an air turbine) rotating at a high speed of 400,000 rpm.

The invention claimed is:

1. A tooth for a jaw tooth model provided with standards for evaluating tooth formation, the tooth comprising a non-deletable shape part, a deletable shape part and a forming interface part,
    wherein the non-deletable shape part is an unsintered baked body formed of a polycrystalline inorganic powder, the deletable shape part is an unsintered baked body formed of a polycrystalline inorganic powder, and the forming interface part comprises a resin and a fluorescent dye material,
    the unsintered baked body of the non-deletable shape part is selected from the group consisting of an alumina-based unsintered baked body, a zirconia-based unsintered baked body, a silica-based unsintered baked body, and a combination thereof, and
    the unsintered baked body of the deletable shape part is selected from the group consisting of an alumina-based unsintered baked body, a zirconia-based unsintered baked body, a silica-based unsintered baked body, and a combination thereof.

2. The tooth for a jaw tooth model according to claim 1, wherein the unsintered baked body of the non-deletable shape part is an alumina silicate, and the unsintered baked body of the deletable shape part is an alumina silicate.

3. The tooth for a jaw tooth model according to claim 1, wherein the unsintered baked body of the non-deletable shape part is an alumina silicate containing 5 to 40% by weight of $Al_2O_3$, 40 to 90% by weight of $SiO_2$, and 1 to 15% by weight of at least one of sodium oxide, potassium oxide and lithium oxide, and
    the unsintered baked body of the deletable shape part is an alumina silicate containing 5 to 40% by weight of $Al_2O_3$, 40 to 90% by weight of $SiO_2$, and 1 to 15% by weight of at least one of sodium oxide, potassium oxide and lithium oxide.

4. The tooth for a jaw tooth model according to claim 1, wherein the unsintered baked body of the non-deletable shape part is an alumina silicate containing 100% by weight of $Al_2O_3$, and
    the unsintered baked body of the non-deletable shape part is an alumina silicate containing 100% by weight of $Al_2O_3$.

* * * * *